United States Patent [19]

Pierrey et al.

[11] Patent Number: 4,560,530
[45] Date of Patent: Dec. 24, 1985

[54] DEVICE FOR PROVIDING PROTECTION AGAINST HEAT AND RADIATION FOR AN INTERMEDIATE HEAT EXCHANGER IMMERSED IN A NUCLEAR REACTOR VESSEL

[75] Inventors: Jean-Louis Pierrey, Bourg la Reine; Michel Thévenin, Fresnes, both of France

[73] Assignee: Novatome, Le Plessis Robinson, France

[21] Appl. No.: 472,815

[22] Filed: Mar. 7, 1983

[30] Foreign Application Priority Data

Apr. 2, 1982 [FR] France ............................. 82-05769

[51] Int. Cl.[4] .......................... G21C 1/02; G21C 1/32
[52] U.S. Cl. .................................... 376/290; 376/404
[58] Field of Search ............... 376/203, 287, 289, 290, 376/291, 292, 404, 405, 461

[56] References Cited

U.S. PATENT DOCUMENTS

| | | | |
|---|---|---|---|
| 3,764,468 | 10/1973 | Hind | 376/290 |
| 3,822,186 | 7/1974 | Rajakovics | 376/289 |
| 3,888,730 | 6/1975 | Jackson | 376/290 |
| 4,035,232 | 7/1977 | Kube | 376/203 |
| 4,331,512 | 5/1982 | Facha et al. | 376/287 |
| 4,357,297 | 11/1982 | Dupen | 376/289 |
| 4,377,552 | 3/1983 | Doublet et al. | 376/405 |

FOREIGN PATENT DOCUMENTS 0012691 6/1980 European Pat. Off. ............ 376/405

Primary Examiner—Deborah L. Kyle
Assistant Examiner—Richard W. Wendtland
Attorney, Agent, or Firm—Pollock, Vande Sande & Priddy

[57] ABSTRACT

A device for providing protection against heat and radiation for an intermediate heat exchanger immersed in the vessel of a nuclear reactor. In its upper part, the exchanger has an inner sleeve (8a) inside which a liquid metal circulates, and an outer sleeve (8b), these sleeves being joined by a Y-shaped connector (25). A peripheral space is provided around the outer sleeve (8b), inside the passage (3) through the slab (2) covering the reactor vessel. The protection device comprises a sleeve (27) fixed under the flange (18) and carrying, in its lower part, a solid piece (30) occupying the greater part of the peripheral space around the sleeve (8b). In its upper part, under the flange (18), the sleeve (27) carries a heat insulation means (32) of annular shape. The Y-shaped connector (25) is located in the central part of the sleeve (27), between the solid piece (30) and the heat insulation means (32). The invention is applicable, in particular, to fast neutron nuclear reactors cooled by liquid sodium.

4 Claims, 2 Drawing Figures

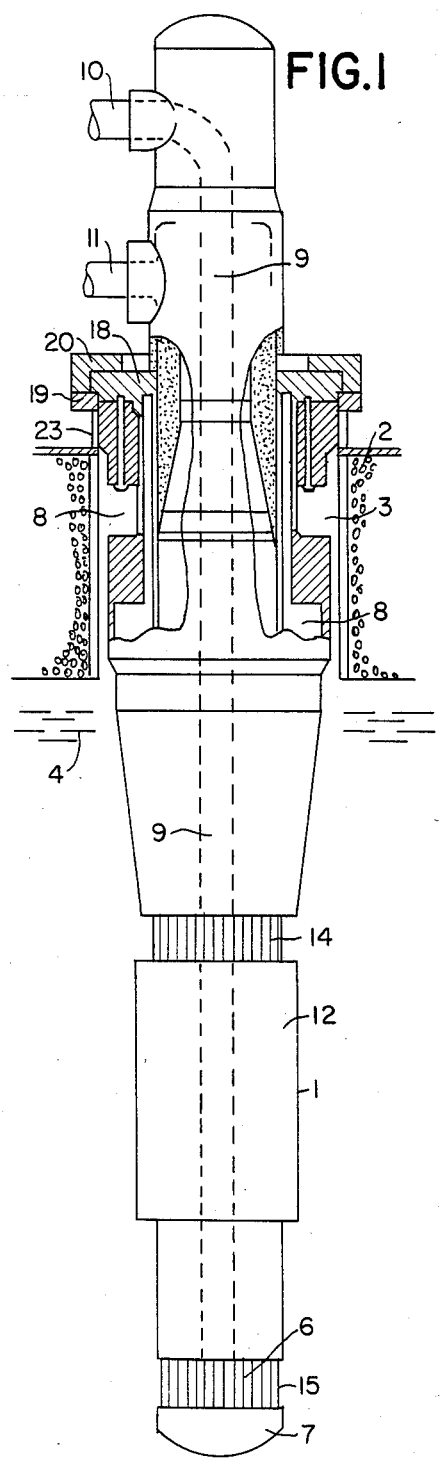

DEVICE FOR PROVIDING PROTECTION AGAINST HEAT AND RADIATION FOR AN INTERMEDIATE HEAT EXCHANGER IMMERSED IN A NUCLEAR REACTOR VESSEL

FIELD OF THE INVENTION

The invention relates to a device for providing protection against heat and radiation for an intermediate heat exchanger immersed in a nuclear reactor vessel filled with liquid metal constituting the primary fluid of the reactor.

BACKGROUND OF THE INVENTION

Fast neutron nuclear reactors generally comprise a main vessel of large dimensions, filled with liquid sodium surmounted by an inert gas such as argon, and closed by a very thick, horizontal slab in which openings are provided for the reactor components to pass through.

In particular, the primary pumps which circulate the liquid sodium filling the vessel, and the intermediate exchangers which effect the heat exchange between the primary sodium filling the vessel and the secondary sodium carrying the heat to the steam generators, pass through the slab inside openings of large dimensions and rest on the reactor slab via a flange fixed to their upper parts.

The intermediate heat exchangers comprise a lower part of large diameter, immersed in the liquid sodium, so that the passage in the slab must have a sufficiently large diameter to allow the intermediate exchanger to be introduced or removed without difficulty.

A peripheral space of sufficiently large width is therefore left around the upper part of the intermediate exchanger, in the opening provided in the reactor slab. Hence, it is necessary to limit the circulation of the hot gases and to prevent the escape of the radiation originating from the irradiated elements of the reactor in this peripheral space.

Moreover, the secondary sodium circulates firstly from top to bottom through a passage located in the central part of the exchanger, and then from bottom to top through a nest of tubes where the heat exchange with the primary fluid takes place.

On leaving the nest of tubes, the hot secondary liquid sodium circulates from bottom to top through an annular passage limited in its central part by the sodium downflow passage, and in its peripheral part by a sleeve with a vertical axis, constituting the envelope of the intermediate exchanger.

In the upper part of the exchanger, this sleeve divides into an inner sleeve, inside which the hot secondary sodium circulates, and an outer sleeve, to which the flange of the exchanger is fixed. The inner sleeve and outer sleeve are joined to one another and to the upper part of the exchanger by a symmetrical connector with a Y-shaped cross-section, which is a body of revolution.

It is important to protect the passage through the slab, in particular in its upper part, against the heat evolved by the secondary liquid sodium circulating in the intermediate exchanger.

It is also important to protect the connector between the sleeves of the intermediate exchanger against unfavorable heat conditions, this connector being extremely important for the mechanical strength of the intermediate exchanger.

SUMMARY OF THE INVENTION

The object of the invention is therefore to propose a device for providing protection against heat and radiation for an intermediate heat exchanger immersed in a nuclear reactor vessel filled with liquid metal constituting the primary fluid of the reactor, and passing through a very thick slab closing the vessel, on which the exchanger rests via a flange fixed to its upper part, the exchanger comprising, in its upper part, an inner sleeve with a vertical axis, inside which secondary liquid metal heated by the primary fluid circulates, and an outer sleeve joined to the inner sleeve by a connector of Y-shaped cross-section and coaxial with the latter, a peripheral space being provided around the outer sleeve, in the opening passing through the slab, which device makes it possible efficiently to insulate the intermediate exchanger in its passage through the slab, both as regards radiation and as regards the heat evolved by the secondary sodium.

For this purpose, the device comprises a sleeve coaxial with the inner and outer sleeves fixed under the flange, in the peripheral space around the outer sleeve, and carrying, in its lower part, a solid annular piece for providing insulation against radiation, the cross-section of which is such that it occupies the greater part of the cross-section of the annular space, and, in its upper part, under the flange, a heat insulation means of annular shape, the Y-shaped connector being located in the region of the central part of the sleeve, between the solid piece and the heat insulation means.

To provide a clear understanding of the invention, an intermediate heat exchanger comprising a device for providing protection against heat and radiation, according to the invention, will now be described by way of example, with reference to the accompanying drawings.

BRIEF DESCRIPTION OF THE DRAWINGS

FIG. 1 shows a view in elevation of an intermediate exchanger in position in the vessel of a fast neutron nuclear reactor cooled by liquid sodium.

FIG. 2 is a greatly enlarged sectional view of the upper part of the intermediate heat exchanger, in the region of the passage through the slab.

DETAILED DESCRIPTION

FIG. 1 shows an intermediate exchanger 1 passing through the slab 2 of a fast neutron nuclear reactor via an opening 3 the diameter of which is slightly greater than the maximum diameter of the heat exchanger. The slab 2 closes the upper part of the vessel containing liquid sodium as far as the level 4. The heat exchanger immersed in the liquid sodium comprises, in its immersed part, a nest of tubes 6 communicating at one of its ends with a lower chamber limited by a curved base 7, and in its upper part with an annular chamber limited by a sleeve 8 with a vertical axis and by a vertical double sleeved central pasaage 9.

In its upper part, the central passage 9 emerges into the tube 10 for introducing secondary liquid sodium into the steam generator.

The annular chamber between the sleeves 8 and 9 communicates in its upper part with the tube 11 for withdrawing the heated secondary sodium. The tubes 10 and 11 are joined to the secondary sodium circuit of the nuclear reactor.

The outer sleeve 12 surrounding the intermediate exchanger in its lower part has an aperture 14 for introducing the primary sodium into the heat exchanger, and an aperture 15 for withdrawing this primary sodium.

In the course of its circulation between the apertures 14 and 15, the primary sodium contained in the reactor vessel heats the secondary sodium circulating in the nest of tubes 6. The secondary sodium entering the annular chamber limited by the sleeves 8 and 9 is therefore hot sodium which, before leaving through the tube 11, is caused to pass through that part of the exchanger which is located in the region of the slab 2.

A flange 18 fixed to the sleeve 8 makes it possible for the heat exchanger to rest on the slab 2 via a support 19, a counter-flange 20 enabling the flange to be fixed to its support.

The device for providing protection against heat and radiation, located in the region of the slab, will now be described with reference to FIG. 2, the intermediate exchanger being in the operating position as shown in FIG. 1.

The opening 3 in the slab is surrounded by a metal jacket 21 to which the flange support 19 is fixed via a fixing sleeve 23.

The sleeve 8 is fixed to the flange 18. This sleeve 8 divides into an inner sleeve 8a and an outer sleeve 8b by virtue of an annular connector 25 of Y-shaped cross-section.

The central passage 9 consists of a double sleeve 9a, 9b, there being an inert gas for heat insulation in the space inside this double sleeve.

The hot secondary liquid sodium leaving the nest of tubes circulates from bottom to top through the annular passage provided by the sleeves 8 and 9 and then by the sleeve 8a and the double sleeve 9.

A heat insulator 26, consisting of a mineral lagging material, is located between the inner sleeve 8a, in contact with the hot secondary liquid sodium, and the outer sleeve 8b.

By means of screws 28, a sleeve 27 is fixed under the flange 18, in the region of the connector of the sleeve 8. This sleeve 27 is coaxial with the sleeve 8 and has a slightly greater diameter than this sleeve.

In its lower part, the sleeve 27 is welded to a solid annular piece 30 made of ordinary steel, the width of which is such that this piece occupies the larger part of the annular space between the coaxial sleeves 8 and 21.

In its lower part, the annular piece 30 is extended by a sleeve 31 as far as the lower level of the slab 2 and of the sleeve 31 limiting the opening in the latter on the inside.

The sleeve 31 makes it possible to protect the passage through the slab 2 and the sleeve 21 against the heat radiation emanating from the sleeve 8 inside which the hot sodium flows.

The solid piece 30 makes it possible to absorb the radiation emanating from the irradiated elements and components contained in the reactor vessel.

Above the solid steel piece 30, the sleeve 27 provides protection against the heat radiation from the sleeve 8. It is in this zone that the connector 25 of the sleeves 8, 8a and 8b is located.

An annular enclosure 32 is located in the upper part of the sleeve 27 and under the flange 18; a metal lagging, consisting of separated elements forming a barrier to heat radiation, is located inside this annular enclosure. The space inside the annular enclosure 32 is filled with insulating argon. Tubes 34 assure correct assembly of the parts forming the enclosure 32 and of the metal lagging.

Steel discs can also be arranged inside the enclosure 32; these form a barrier to the heat radiation and are held apart by the tubes 34.

The external diameter of the enclosure 32 is very slightly less than the internal diameter of the support 19 and of the sleeve 23.

In this way, the hot gases present above the liquid sodium in the vessel cannot reach the upper part of the slab on which the flange 18 of the intermediate heat exchanger rests.

An elastic metal ring 35, composed of 3 sectors arranged 120° apart around the sleeve 8 of the heat exchanger, is located between the sleeve 8 and the sleeve 27. This elastic ring makes it possible to limit the movements of convection gases in the space between the parts 8 and 27 and hence to limit the introduction of heat into the top part of the apparatus.

The main advantages of the device according to the invention is that it provides excellent protection against heat and radiation for that part of the slab which is located in the region of the passage, and for that zone near the intermediate heat exchanger which is located above the slab 2.

The device is of very simple construction and makes it possible to avoid heat deformation of the Y-shaped connector, which would detract from its mechanical strength.

The lower part of the device, comprising the solid piece 30 and the sleeve 31, can be constructed from ordinary steel, thereby reducing the construction cost of the heat exchanger. The whole of the protection device which is not in contact with the liquid sodium can also be made of ordinary steel.

Finally, the introduction of the protection device inside the peripheral space located around the latter in the passage through the slab takes place automatically when the heat exchanger is introduced inside the vessel.

The solid piece 30 can be made of a material other than ordinary steel. The metal lagging inside the enclosure 32 can be produced in any desired form or can consist of a set of discs forming an anti-radiation shield and it can comprise devices of any desired type for filling it with argon and emptying it.

The mineral lagging 26 located between the sleeves 8a and 8b can consist of blocks of any desired shape, juxtaposed and arranged in the annular gap as far as the region of the flange 18 or slightly above it.

All the parts outside the sleeve 8 containing the liquid sodium can be made of ordinary oxidizable steel, thereby reducing the construction cost of the heat exchanger.

The device according to the invention is applicable to all intermediate heat exchangers used in fast neutron nuclear reactors of integrated type.

We claim:

1. In a nuclear reactor system having a vessel filled with liquid metal constituting the primary coolant of the reactor, said vessel being covered by a very thick slab (2), an intermediate heat exchanger having a portion thereof immersed in said coolant, an upper portion of said heat exchanger passing through said slab and resting on said slab via a flange fixed to said upper portion, said exchanger comprising a sleeve (8) fixed to said flange, inside which secondary liquid metal heated by primary fluid circulates, said sleeve (8) disposed vertically with its axis along the axis of said heat exchanger consisting of a double-walled sleeve in said upper part, the two walls of said sleeve (8) being in the form of two coaxial sleeves joined by a connector of Y-shaped cross-section and comprising an inner sleeve (8a) in which the secondary liquid metal circulates and an outer sleeve (8b) passing through said slab in such manner that a peripheral space is provided around said outer sleeve (8b), and a device for providing protection against heat and radiation comprising a sleeve (27) coaxial with said inner and outer sleeves (8a, 8b), fixed under said flange (18), in the peripheral space around said outer sleeve (8b), said sleeve (27) having a lower portion carrying a solid annular piece (30) for providing insulation against radiation, the cross-section of said solid annular piece being such that it occupies the greater part of the cross-section of said peripheral space, and said sleeve (27) having an upper portion under said flange (18), carrying an annular heat insulation means (32), said Y-shaped connector (25) being located in the region of the central part of said sleeve (27), between said solid annular piece (30) and said heat insulation means (32) said solid annular piece (30) being spaced apart from said annular heat insulation means (32).

2. A device according to claim 1, wherein said solid annular piece (30) is extended in its lower part by a sleeve (31) coaxial with said sleeve (8) of said heat exchanger, as far as the lower level of said reactor slab (2).

3. A device according to claim 1 or 2, wherein said solid annular piece (30) is made of carbon steel.

4. A device according to claim 1 or 2, wherein the whole of said device is made of carbon steel.

* * * * *